(12) United States Patent
Natale

(10) Patent No.: US 12,337,751 B2
(45) Date of Patent: Jun. 24, 2025

(54) TRAILER WARNING LIGHT ADAPTER MODULE

(71) Applicant: Atomic LED, Inc., Greenville, RI (US)

(72) Inventor: Mark Natale, Greenville, RI (US)

(73) Assignee: Atomic LED, Inc., Greenville, RI (US)

( * ) Notice: Subject to any disclaimer, the term of this patent is extended or adjusted under 35 U.S.C. 154(b) by 140 days.

(21) Appl. No.: 18/451,168

(22) Filed: Aug. 17, 2023

(65) Prior Publication Data

US 2024/0059215 A1 Feb. 22, 2024

Related U.S. Application Data

(60) Provisional application No. 63/478,123, filed on Dec. 31, 2022, provisional application No. 63/371,752, filed on Aug. 17, 2022.

(51) Int. Cl.
| | | |
|---|---|---|
| *G08B 21/00* | (2006.01) | |
| *B60D 1/64* | (2006.01) | |
| *B60Q 1/00* | (2006.01) | |
| *B60Q 1/46* | (2006.01) | |
| *G08C 17/02* | (2006.01) | |

(52) U.S. Cl.
CPC .............. *B60Q 1/46* (2013.01); *B60D 1/64* (2013.01); *B60Q 1/0094* (2013.01); *G08C 17/02* (2013.01)

(58) Field of Classification Search
CPC .... B60Q 1/46; B60Q 1/0094; B60Q 2900/30; B60Q 1/305; B60D 1/64; G08C 17/02; H01R 24/66
See application file for complete search history.

(56) References Cited

U.S. PATENT DOCUMENTS

| | | | | |
|---|---|---|---|---|
| 6,097,283 A | * | 8/2000 | Szudarek | ............... B60Q 1/305 340/475 |
| 6,909,363 B2 | * | 6/2005 | Bell | ........................ B60R 16/03 303/123 |
| 7,491,065 B2 | * | 2/2009 | Wagner | .............. H01R 13/5213 439/35 |
| 8,323,036 B2 | * | 12/2012 | Workman | ................ B60D 1/62 439/35 |
| 10,124,271 B2 | | 11/2018 | Natale | |
| 2017/0349093 A1 | | 12/2017 | Peacock | |
| 2024/0359673 A1 | * | 10/2024 | Fosdike | ................. B60Q 1/305 |
| 2024/0416698 A1 | * | 12/2024 | Sickler | ................. H01R 4/4816 |

* cited by examiner

*Primary Examiner* — Toan N Pham
(74) *Attorney, Agent, or Firm* — Hinckley Allen & Snyder; Stephen Holmes

(57) ABSTRACT

A trailer tow light warning system comprises a flashing light adapter module having standardized male and female tow plug connectors which can be integrated in a variety of inline configurations including as an inline adapter, as a factory vehicle tow light receptacle replacement or as an OEM trailer wiring harness replacement.

20 Claims, 4 Drawing Sheets

TRAILER WARNING LIGHT ADAPTER MODULE

CROSS-REFERENCE TO RELATED APPLICATIONS

This application claims the benefit of U.S. Provisional Patent Application No. 63/371,752 filed Aug. 17, 2023 and also the benefit of U.S. Provisional Patent Application No. 63/478,123 filed Dec. 31, 2022, the entire contents of which are both incorporated herein by reference.

BACKGROUND OF THE INVENTION

The present disclosure relates generally to vehicle lighting systems and trailer exterior lighting functions and more particularly to an trailer warning light adapter system comprising a flashing light adapter module having standardized male and female tow plug connectors which can be integrated in a variety of inline configurations including as an inline adapter, as a factory vehicle tow light receptacle replacement or as an OEM trailer wiring harness replacement.

Many cars and trucks are equipped with a towing package including a trailer tow light receptacle which receives a standardized 7-pin trailer wiring plug to connect the vehicle lights to the trailer lights. A trailer wiring harness and plug system typically includes connections for standard running lights, stop lights, back up lights, brake lights, directional or turn signals, brake assist power, as well as standard power and ground.

Emergency responders and others involved in various trades often have a need for warning lights that flash and strobe to alert other motorists of their approach or location. Adding this functionality to a vehicle often means adding additional lights to the vehicle, custom mounting, drilling holes in the vehicle and cutting and splicing wires into the vehicle electrical system.

SUMMARY OF THE INVENTION

A trailer tow light flashing warning light adapter system as described herein solves the problems of adding a flashing warning light function to the trailer lights without requiring any cutting of any wires or modification of the vehicle or trailer or mounting of any exterior warning lights on the vehicle.

In an exemplary embodiment, the warning light flasher module system comprises an in-line adapter flasher module having a male input connector extending from an input end of the flasher module and a female output plug connector extending from an output end of the flasher module. In use, the system is connected in-line between the vehicle's factory female tow harness receptacle and the mating male tow harness plug.

More specifically, the input side of the flasher module system includes a male trailer tow plug body comprising a standard 7 pin circular blade pattern male plug body which is receivable into a standard 7 blade OEM vehicle trailer female plug receptacle and on the output side comprises a corresponding female 7 pin circular blade plug receptacle, the same as would be found as the OEM plug receptacle on the vehicle. In this manner, the flasher adapter plug body may be received inline between the vehicle receptacle and the tow light harness. The flasher adapter plug system includes internal connecting wiring which passes the electrical connections from the vehicle receptacle through the module body from the male plug end to the female receptacle end and ultimately to the trailer wiring harness plug.

Spliced into the through wire connections and contained within the flasher module body is a flasher module configured to selectively operate the trailer lights with a flashing pattern. The flasher module includes an integrated circuit powered by the pass-through voltage. The controller includes a memory preprogrammed with several flash patterns that may be selected by the user by a mode input switch. This electrical flasher circuit is well known in the art and need not be described herein.

The flasher module includes an on/off switch to selectively activate the flasher system and a mode button as noted above, to selective cycle through the various flash patterns.

The flasher adapter module may also include a wireless transmitter and receiver for remote control of the adapter through RF signals. Bluetooth connection, vehicle WiFi and/or other cellular or wireless signal systems are also contemplated herein.

While the above exemplary embodiment and illustrations herein depict a standardized 7 pin tow harness plug system, the flasher system of the present invention can be adapted to provide a flasher function to any trailer tow harness wiring pattern regardless of the number of through wire connections with minor modifications When installed between the vehicle and the trailer and activated, the flasher unit augments the normal trailer lighting functions with a flashing light function.

In another exemplary embodiment, the same flasher module system may be installed directly on the vehicle where it will can become be a fixed installation on the vehicle. The flasher module body includes mounting lugs, or a magnetized base, for installation onto the vehicle adjacent to the factory female plug receptacle. In this regard the OEM female plug receptacle is removed from the vehicle mounting hole, and the male connector plug is plugged into the factory female plug. The female connector receptacle of the flasher module system is then snapped into the vehicle mounting opening to take the place of the factory installed receptacle. This integrates the module directly into the vehicle without any modification of the vehicle wiring.

In yet another embodiment, the flasher module system is configured to be installed directly into the trailer wiring system as an OEM wiring harness during manufacture or by an end user or installer. In this regard, the female output receptacle is removed and a bare 7 wire pigtail end is provided for direct connection to the trailer wiring harness. Trailer running lights, brake lights, reverse lights and blinker lights are wired to module pigtail in a conventional wiring pattern.

The flasher module body includes mounting lugs and/or a magnetic base for installation/mounting onto the trailer frame at a suitable location, and includes the same male connector plug (with an extended lead cable) which will plug into the factory female plug found as part of standard factory trailer/tow package.

BRIEF DESCRIPTION OF THE DRAWING FIGURES

These and other features, aspects, and advantages of the present invention will become better understood with reference to the following description, appended claims, and accompanying drawings where:

Figure 1:
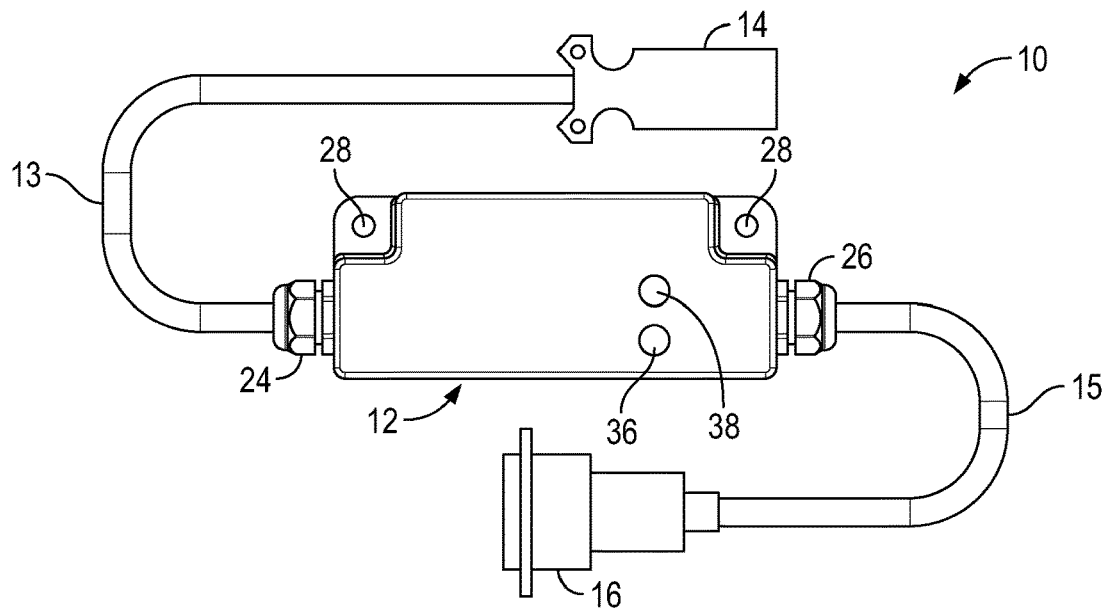
FIG. 1 is plan view of an exemplary trailer tow light adapter module and inline plug ends.
Figure 2:
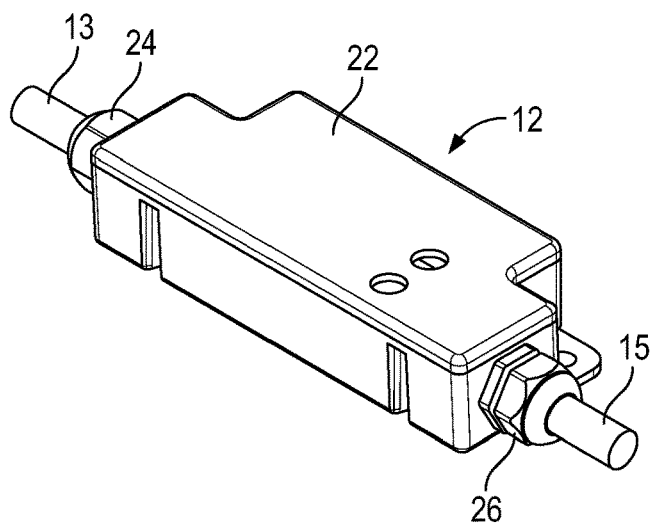
FIG. 2 is a top perspective view of the adapter module body.
Figure 3:
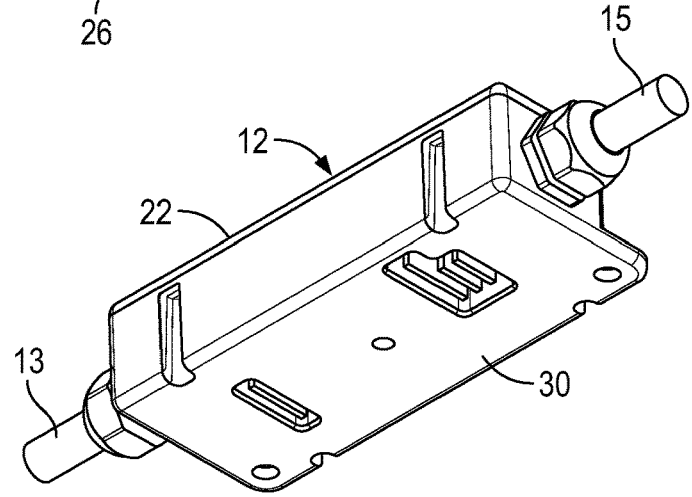
FIG. 3 is a bottom perspective view of the adapter module body.
Figure 4:
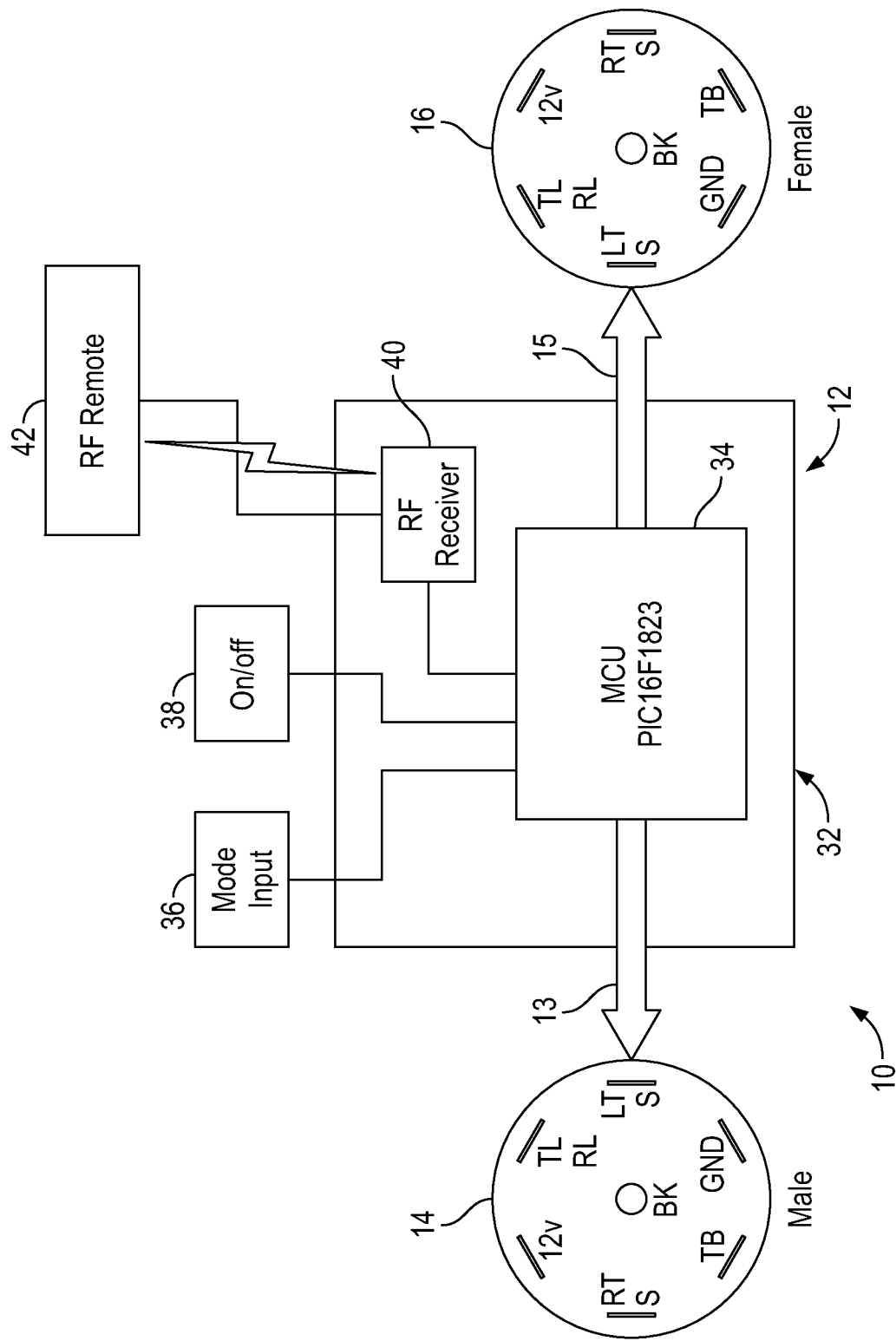
FIG. 4 is a block diagram of the adapter module system.
Figure 5:
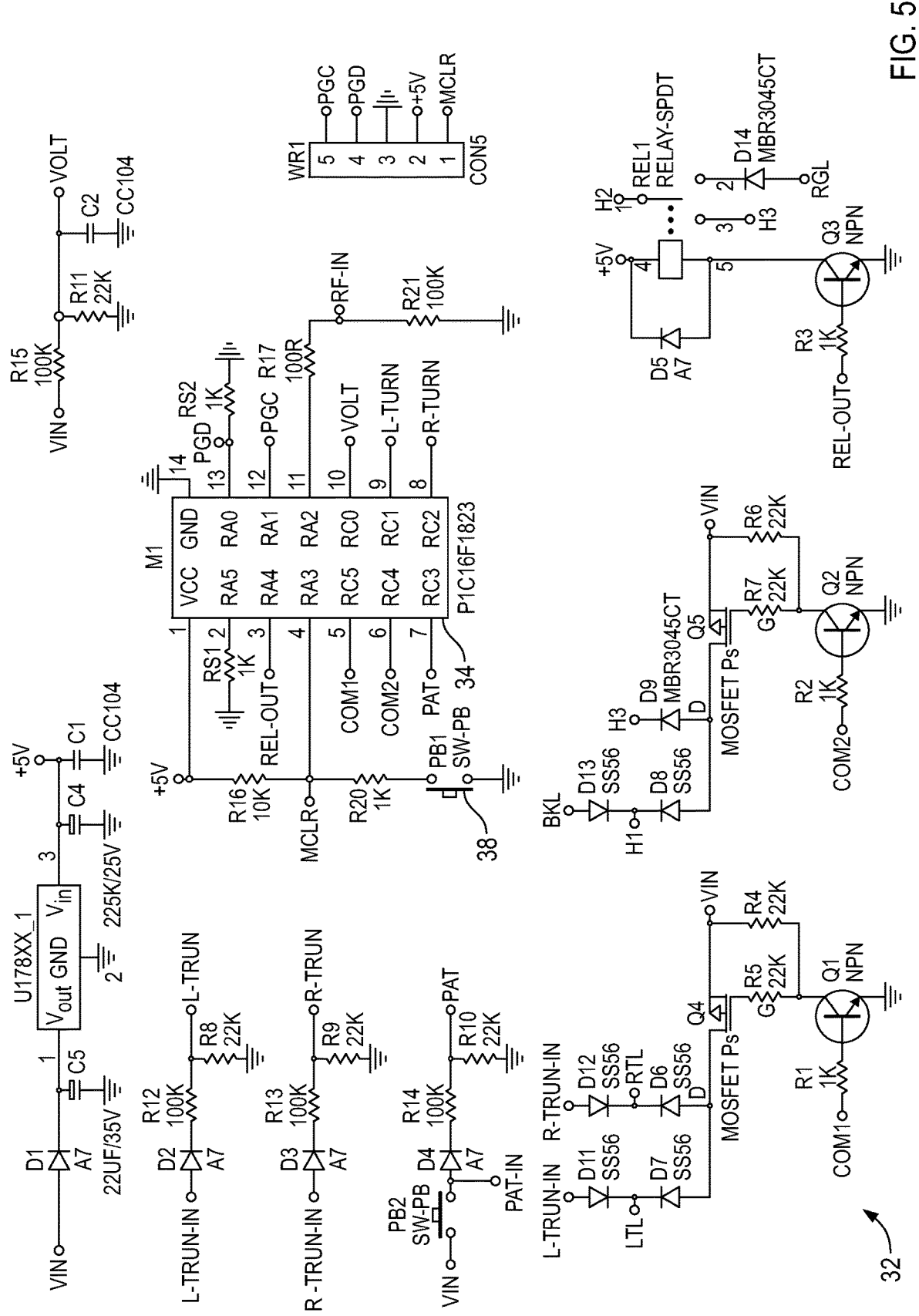
FIG. 5 is a schematic diagram of the adapter module system.
Figure 6:
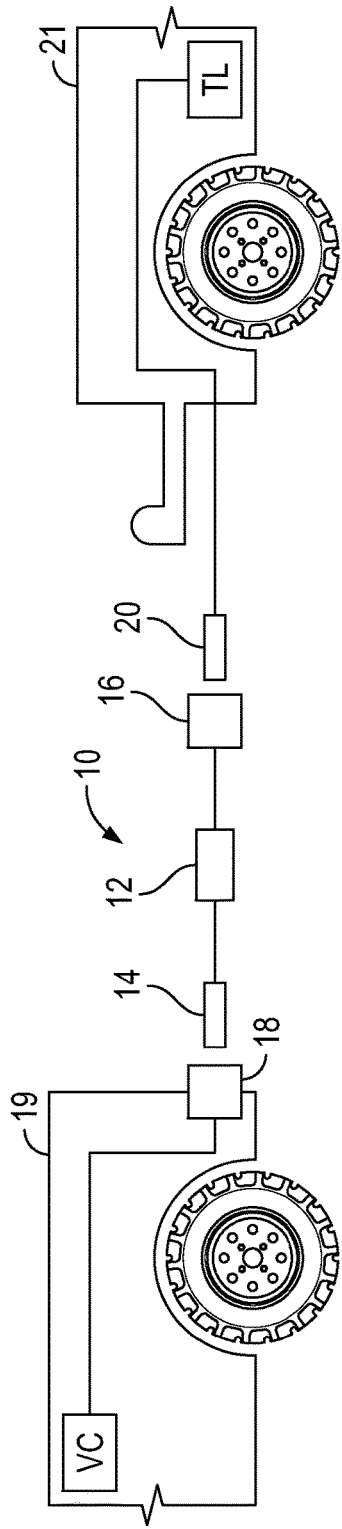
FIG. 6 is an illustration of the adapter module system integrated in an inline configuration between a vehicle tow receptacle and a trailer tow plug.
Figure 7:
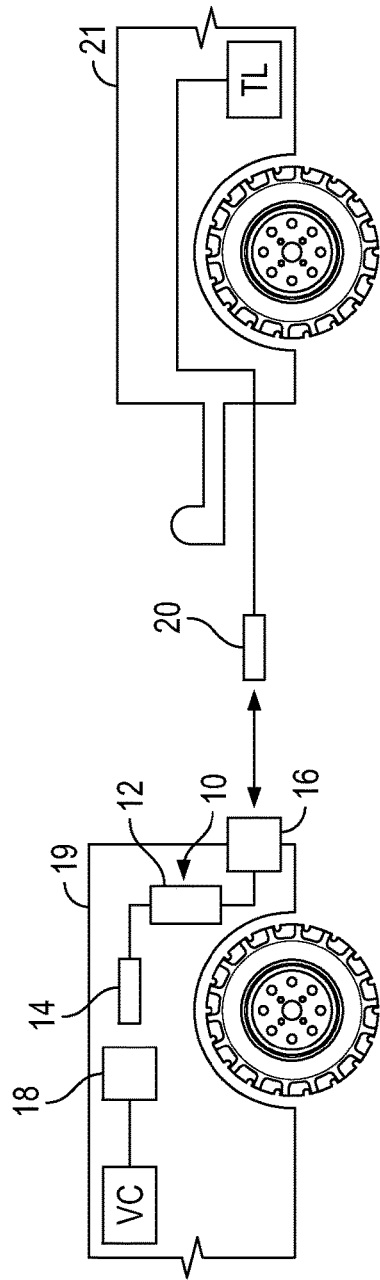
Figure 8:
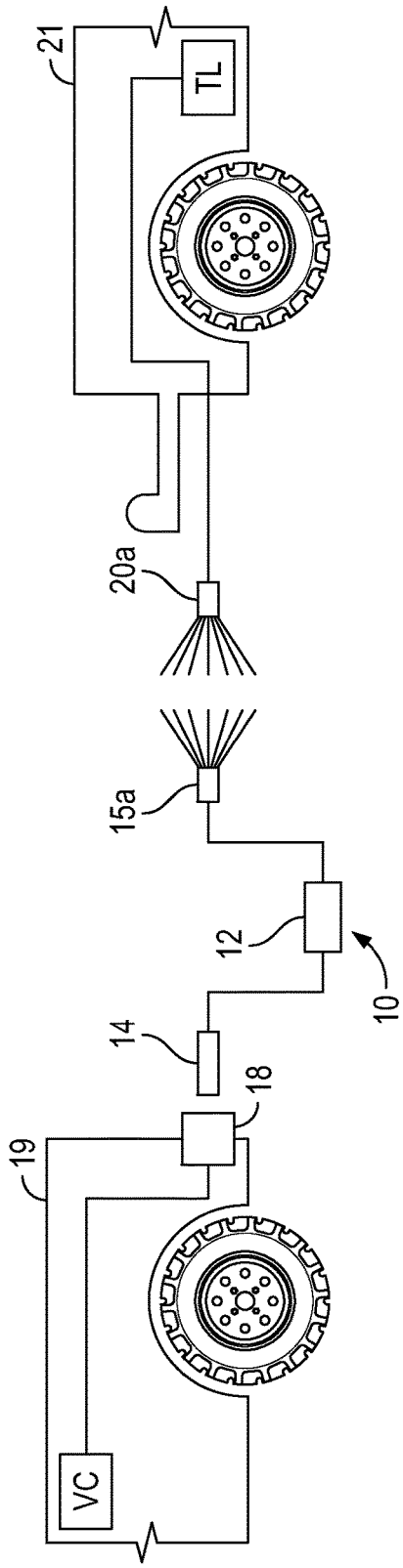

FIG. 7 is an illustration of the adapter module system integrated in an inline configuration between a vehicle tow receptacle and a trailer tow plug where the module system is mounted within the vehicle body and the female plug receptacle is mounted in place of the OEM receptacle; and FIG. 8 is an illustration of the adapter module system integrated in an pigtail trailer configuration with the module pigtail connected directly to the trailer light wiring harness.

DETAILED DESCRIPTION OF THE EXEMPLARY EMBODIMENTS

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Referring now to FIGS. 1-6, a trailer warning light system as described herein solves the problems of adding a flasher function to trailer lights without requiring any cutting of wires or modification of the vehicle wiring or trailer wiring or mounting of any additional exterior warning lights on the vehicle.

In an exemplary embodiment, the warning light flasher system 10 comprises an in-line adapter flasher module 12 having a male input wiring harness 13 and connector 14 extending from an input end of the flasher module 12 and a female output wiring harness 15 and connector receptacle 16 extending from an output end of the flasher module 12. As noted above, the adapter system 10 is connected in-line between the factory female tow harness receptacle 18 of a vehicle 19 and the mating male trailer tow harness plug 20 of a trailer 21 ultimately establishing a direct connection between the vehicle computer (VC) and the trailer lights (TL).

The flasher module 12 includes a water tight housing enclosure 22 and wire harness fittings 24, 26 along with mounting lugs 28 on the base wall 30 for mounting to either the vehicle or trailer frame as desired. The base wall 30 of the enclosure is either magnetized or includes a magnetized insert to allow the enclosure to be magnetically adhered to any ferrous vehicle surface.

Contained within the flasher module housing 22 is a flasher control circuit 32 configured to selectively operate the trailer lights (TL) with a flashing pattern. The flasher circuit 32 includes an integrated controller 34 (such as PIC16F1823) powered by the pass-through voltage from the vehicle 19. The controller circuit 32 or the integrated controller 34 may include a memory preprogrammed with one or more flash patterns that may be selected by the user by a mode input switch 36.

The flasher circuit 32 includes an on/off switch 38 to selectively activate the flasher system 10 and a mode button/switch 36 as noted above, to selectively cycle through the various flash patterns.

The flasher adapter circuit 32 may also include a wireless receiver 40 for remote control of the adapter 10 through RF signals generated by a paired wireless RF remote transmitter 42. Bluetooth connection, vehicle WiFi and/or other cellular or wireless signal systems are also contemplated herein.

The input side of the flasher module system 10 includes a 7-wire input wiring harness 13 including wiring conductors for Vin (12V), ground (GND), trailer/running lights (TL/RL), backup lights (BK), right turn signal and stop light (RT/S?, left turn signal and stop lights (LT/S), and trailer braking power (TB) connected at proximal ends thereof with respective inputs to the flasher control circuit 32 and a male trailer tow plug connector 14 comprising a standard 7-pin circular blade pattern male plug body which is receivable into a standard 7 blade OEM vehicle female plug receptacle 18.

The output side comprises a 7-wire output wiring harness 15 including wiring conductors for Vout (12V), ground (GND), trailer/running lights (TL/RL), backup lights (BK), right turn signal and stop light (RT/S), left turn signal and stop light (LT/S), and trailer braking power (TB) connected at proximal ends thereof with respective outputs from the flasher control circuit 32 and a corresponding female 7-pin circular blade plug receptacle 16, the same as would be found as the OEM plug receptacle 18 on the vehicle 19.

In this manner, the flasher adapter system 10 may be received inline between the vehicle receptacle 18 and the tow light harness plug 20. The flasher adapter circuit 32 includes internal connecting wiring and circuits which passes the electrical connections from the vehicle receptacle 18 through the control circuit 32 from the male plug end 14 to the female receptacle 16 end and ultimately to the trailer wiring harness plug 20.

While the above exemplary embodiment and illustrations herein depict a standardized 7-pin tow harness plug and wiring system, the flasher system 10 of the present invention can be adapted to provide a flasher function to any trailer tow harness wiring pattern regardless of the number of through wire connections with minor modifications.

When installed between the vehicle 19 and the trailer 21 and activated, the flasher unit 10 augments the normal trailer lighting functions with a flashing light function.

Referring now to FIG. 7, the same flasher module system 10 may be installed directly within any open space within the rear of the vehicle 19 where it can become be a fixed or removable installation on the vehicle. As noted above, the flasher module body 22 includes mounting lugs 28, or a magnetized base 30, for installation onto the vehicle 19 adjacent to the factory female plug receptacle location on the vehicle. In this regard the vehicle OEM female plug receptacle 18 is removed from the vehicle mounting hole, and the male connector plug 14 from the system 10 is plugged into the factory female plug 18. The OEM vehicle female plug body design includes snap connectors for easy mounting and removal. The female connector receptacle 16 of the flasher module system 10 (same OEM factory housing design) is then snapped into the vehicle mounting hole to take the place of the factory installed vehicle OEM receptacle 18. This seamlessly integrates the module 10 directly into the vehicle 19 without any modification of the vehicle wiring.

Referring now to FIG. 8, an other embodiment 100 of the flasher module system is configured to be installed directly into the trailer wiring system as an OEM wiring harness during manufacture or by an end user or installer. In this regard, the female output receptacle is removed and a bare 7-wire pigtail output harness 15A is provided for direct connection to the trailer wiring harness 20A. Power, ground, trailer running lights, L/R turn lights, brake lights, reverse lights and trailer brake power are wired to the module pigtail 15A in a conventional wiring pattern. The flasher module body 22 includes mounting lugs 28 and/or a magnetic base 30 for installation/mounting onto the trailer frame at a suitable location, and includes the same male connector plug 14 (optionally with an extended lead cable) which will plug into the factory OEM female plug 18 found on the vehicle 19 as part of standard factory trailer/tow package.

It can therefore be seen that the exemplary embodiments 10/100 provide a unique and novel trailer warning light system which is easily deployed and integrated with existing vehicle and trailer wiring without having to cut or splice any wires in the factory wiring harnesses.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A trailer tow light flasher system comprising:
    a flasher module comprising a housing and a flasher control circuit enclosed within the housing,
    a 7-wire input wiring harness including wiring conductors for Vin, ground, trailer/running lights, backup lights, right turn signal and stop light, left turn signal and stop lights, and trailer braking power connected at proximal ends thereof with respective inputs to the flasher control circuit,
    a 7-pin male tow connector plug at a terminal end of the input wiring harness, said male connector plug being receivable with an OEM vehicle female two connector receptacle,
    a 7-wire output wiring harness including wiring conductors for Vin, ground, trailer/running lights, backup lights, right turn signal and stop light, left turn signal and stop lights, and trailer braking power connected at proximal ends thereof with respective outputs from the flasher control circuit,
    a 7-pin female tow connector receptacle at a terminal end of the output wiring harness, said female connector receptacle receivable with an OEM trailer male tow connector receptacle, and
    a switch connected with the flasher control circuit for selectively energizing the flasher control circuit between inactive and active modes,
    said flasher control circuit is operative in said first inactive mode whereby vehicle light signals originating in the input wiring harness pass through to the output wiring harness without effect, said flasher control circuit further being programmed with at least one flashing light pattern and operative in said active mode whereby vehicle light signals originating in the input wiring harness are interrupted and passed through to the output wiring harness in a flashing pattern.

2. The trailer tow light flasher system of claim 1 wherein the flasher control circuit is programmed with at least two flashing mode patterns, said system further comprising a mode input switch connected with the flasher control circuit for selecting one of said flashing mode patterns for operation.

3. The trailer tow light flasher system of claim 2 wherein the male and female connector plugs comprise circular 7-blade trailer tow connectors.

4. The trailer tow light flasher system of claim 3 wherein the housing has a magnetic base for magnetic attachment to a vehicle or trailer body structure.

5. The trailer tow light flasher system of claim 2 wherein the housing has a magnetic base for magnetic attachment to a vehicle or trailer body structure.

6. The trailer tow light flasher system of claim 2 wherein the flasher control circuit includes an RF receiver,
    said system further comprising an RF remote control transmitter,
    said flasher control circuit being programmed to receive remote control input signals from said RF transmitter through said RF receiver.

7. The trailer tow light flasher system of claim 1 wherein the male and female connector plugs comprise circular 7-blade trailer tow connectors.

8. The trailer tow light flasher system of claim 7 wherein the housing has a magnetic base for magnetic attachment to a vehicle or trailer body structure.

9. The trailer tow light flasher system of claim 7 wherein the flasher control circuit includes an RF receiver,
    said system further comprising an RF remote control transmitter,
    said flasher control circuit being programmed to receive remote control input signals from said RF transmitter through said RF receiver.

10. The trailer tow light flasher system of claim 1 wherein the housing has a magnetic base for magnetic attachment to a vehicle or trailer body structure.

11. The trailer tow light flasher system of claim 10 wherein the flasher control circuit includes an RF receiver,
    said system further comprising an RF remote control transmitter,
    said flasher control circuit being programmed to receive remote control input signals from said RF transmitter through said RF receiver.

12. The trailer tow light flasher system of claim 1 wherein the flasher control circuit includes an RF receiver,
    said system further comprising an RF remote control transmitter, said flasher control circuit being programmed to receive remote control input signals from said RF transmitter through said RF receiver.

13. A trailer tow light flasher system comprising:
a flasher module comprising a housing and a flasher control circuit enclosed within the housing,
a 7-wire input wiring harness including wiring conductors for Vin, ground, trailer/running lights, backup lights, right turn signal and stop light, left turn signal and stop lights, and trailer braking power connected at proximal ends thereof with respective inputs to the flasher control circuit,
a 7-pin male tow connector plug at a terminal end of the input wiring harness, said male connector plug being receivable with an OEM vehicle female two connector receptacle,
a 7-wire output wiring harness including wiring conductors for Vin, ground, trailer/running lights, backup lights, right turn signal and stop light, left turn signal and stop lights, and trailer braking power connected at proximal ends thereof with respective outputs from the flasher control circuit,
a 7-wire pigtail at a terminal end of the output wiring harness, said 7-wire pigtail receivable with a 7-wire OEM trailer tow pigtail harness, and
a switch connected with the flasher control circuit for selectively energizing the flasher control circuit between inactive and active modes,
said flasher control circuit is operative in said first inactive mode whereby vehicle light signals originating in the input wiring harness pass through to the output wiring harness without effect, said flasher control circuit further being programmed with at least one flashing light pattern and operative in said active mode whereby vehicle light signals originating in the input wiring harness are interrupted and passed through to the output wiring harness in a flashing pattern.

14. The trailer tow light flasher system of claim 13 wherein the flasher control circuit is programmed with at least two flashing mode patterns, said system further comprising a mode input switch connected with the flasher control circuit for selecting one of said flashing mode patterns for operation.

15. The trailer tow light flasher system of claim 14 wherein the housing has a magnetic base for magnetic attachment to a vehicle or trailer body structure.

16. The trailer tow light flasher system of claim 15 wherein the flasher control circuit includes an RF receiver,
said system further comprising an RF remote control transmitter,
said flasher control circuit being programmed to receive remote control input signals from said RF transmitter through said RF receiver.

17. The trailer tow light flasher system of claim 14 wherein the flasher control circuit includes an RF receiver,
said system further comprising an RF remote control transmitter,
said flasher control circuit being programmed to receive remote control input signals from said RF transmitter through said RF receiver.

18. The trailer tow light flasher system of claim 13 wherein the housing has a magnetic base for magnetic attachment to a vehicle or trailer body structure.

19. The trailer tow light flasher system of claim 18 wherein the flasher control circuit includes an RF receiver,
said system further comprising an RF remote control transmitter,
said flasher control circuit being programmed to receive remote control input signals from said RF transmitter through said RF receiver.

20. The trailer tow light flasher system of claim 13 wherein the flasher control circuit includes an RF receiver,
said system further comprising an RF remote control transmitter,
said flasher control circuit being programmed to receive remote control input signals from said RF transmitter through said RF receiver.

* * * * *